United States Patent [19]

Satake

[11] 3,963,970

[45] June 15, 1976

[54] CONTROL CIRCUIT FOR SERVO-MOTORS

[75] Inventor: Yoshihiro Satake, Tokyo, Japan

[73] Assignee: Copal Company Limited, Tokyo, Japan

[22] Filed: Sept. 4, 1974

[21] Appl. No.: 503,528

[30] Foreign Application Priority Data
Sept. 6, 1973  Japan.............................. 48-100695

[52] U.S. Cl................................ 318/640; 318/681; 354/44
[51] Int. Cl.² ........................ G05B 1/06; G03B 7/08
[58] Field of Search........................ 354/43, 44, 271; 352/141; 318/640, 681

[56] References Cited
UNITED STATES PATENTS

| | | |
|---|---|---|
| 3,394,642 | 7/1968 | Teshi et al. .......................... 352/141 |
| 3,426,357 | 2/1969 | Paulus................................... 354/24 |
| 3,430,053 | 2/1969 | Westhaver ........................... 352/141 |
| 3,466,447 | 9/1969 | Fahlenberg ........................... 354/24 |
| 3,641,891 | 2/1972 | Burgarella............................. 354/24 |
| 3,679,905 | 7/1972 | Watanabe .............................. 95/10 |
| 3,772,974 | 11/1973 | Shimomura........................... 354/44 |

Primary Examiner—Gene Z. Rubinson
Assistant Examiner—John J. Feldhaus
Attorney, Agent, or Firm—Cushman, Darby & Cushman

[57] ABSTRACT

A control circuit for servo-motors comprising a photoelectric element, a logarithmic conversion element, one or more operational amplifier, and a constant-current circuit so that various informaton in a wide range can be easily introduced into the circuit and that the influence of change of the power-source voltage and hunting phenomenon can be eliminated.

3 Claims, 7 Drawing Figures

FIG. 4
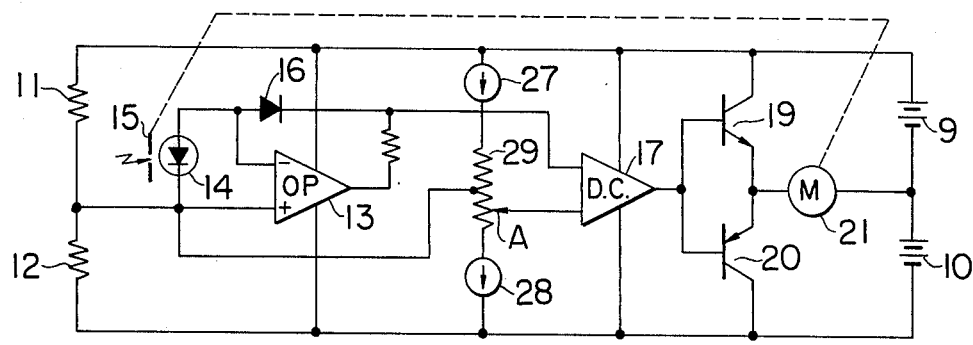
FIG. 5a
FIG. 5b
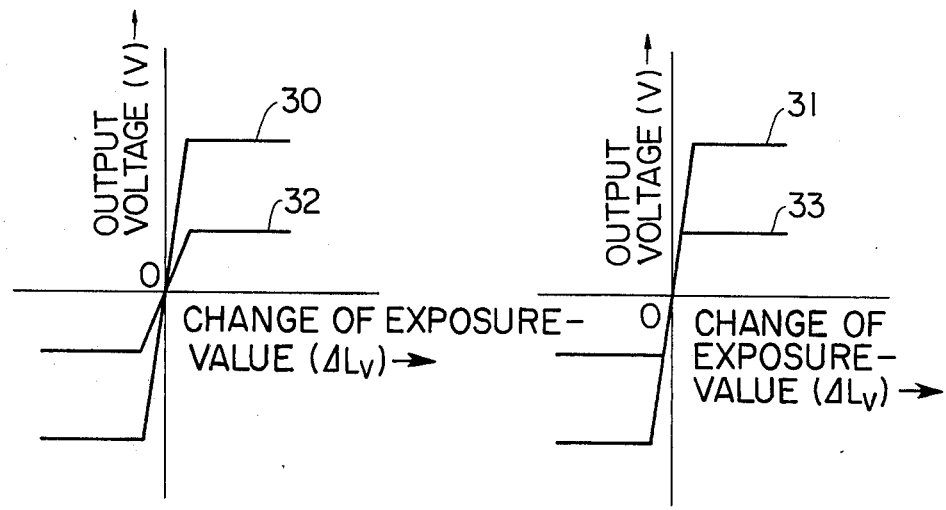
FIG. 6
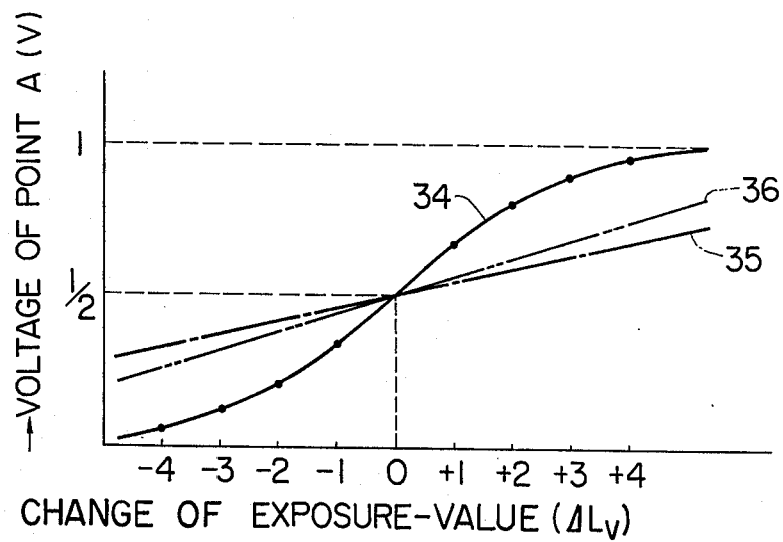

CONTROL CIRCUIT FOR SERVO-MOTORS

BACKGROUND OF THE INVENTION

1. Field of the Invention

The present invention relates to a control circuit for servo-motors and, more particularly, to a control circuit for servo-motors applied to an automatic diaphragm means for cine-cameras.

2. Description of the Prior Art

As the control circuit for servo-motors of this kind, a circuit arranged as shown in FIG. 1 is known. That is, as shown in FIG. 1, a DC amplifier 5 is connected to the output terminal of a Wheatstone bridge circuit comprising a photoconductive element 1 such as CdS and resistors 2, 3 and 4. Besides, a servo-motor 8 is connected to the output terminal of the DC amplifier 5 through transistors 6 and 7 for which the polarity is different from each other. Thus, said servo-motor 8 is rotated in forward or reverse direction according to the polarity of the unbalanced voltage which occurs at the output terminal of said bridge circuit in order to open or close diaphragm blades arranged in front of the photoconductive element 1 until the bridge circuit reaches the balanced state. On the other hand, by rotation of the motor 8 at that time, a photographing lens diaphragm means of the camera is controlled in order to control the exposure value always to the proper amount according to the intensity of light from the object to be photographed.

The above-mentioned control circuit, however, has the following disadvantages. That is, gamma ($\gamma$) of the photoconductive element 1 has to be constant. Besides, when exposure informations such as the sensitivity of the film, film feeding speed, etc. are to be introduced to resistors 3 and 4, the operating range of the DC amplifier 5 will be exceeded if too much information is introduced and, therefore, the information which can be introduced as above is limited. Besides, in case that CdS is used as the photoconductive element 1, the delay in response to CdS tends to become a cause of hunting phenomenon because of fluctuation of the amount of incident light from the object, when exposure information such as sensitivity of the film etc. is set, especially when the resistance value of CdS is large (when the light intensity of the object is low).

SUMMARY OF THE INVENTION

It is, therefore, a primary object of the present invention to provide a control circuit for servo-motors comprising a photoelectric element such as a photodiode or silicon photocell used as a light-receiving element and arranged to detect and compare the voltage obtained by logarithmic conversion of the photoelectric current generated at said photoelectric element and voltage obtained by setting the exposure information such as the sensitivity of the film, film feeding speed, etc., said control circuit for servo-motors being thus arranged to rotate the servo-motor according to the potential difference detected as above and to always operate the diaphragm means always properly and reliably.

Another object of the present invention is to provide a control circuit for servo-motors arranged to improve linearity of characteristic of the amount of incident light vs. voltage produced by incident light in order to facilitate introduction of exposure information and to enlarge the range of exposure information which can be introduced.

Still another object of the present invention is to provide a control circuit for servo-motors arranged, by adding an operational amplifier, so that gain adjustment of the circuit becomes possible and, at the same time, that adjustment of the range of exposure information which can be introduced becomes possible.

Still another object of the present invention is to provide a control circuit for servo-motors arranged, by adding a constant-current circuit, to prevent an influence of fluctuation of the power-source voltage and, at the same time, to prevent hunting phenomenon from occurring.

BRIEF DESCRIPTION OF THE DRAWINGS

FIG. 4 shows a connection diagram of still another embodiment of the control circuit according to the present invention;

FIGS. 5a and 5b respectively show graphs illustrating characteristic of control circuits shown in FIG. 1 and FIG. 4 in which power-source voltage is used a parameter; and FIG. 6 shows a graph of characteristic curves illustrating the relation of change of voltage to the amount of change of exposure value in respective control circuits shown in FIG. 1 and FIG. 2.

DESCRIPTION OF THE PREFERRED EMBODIMENTS

Figure 2:
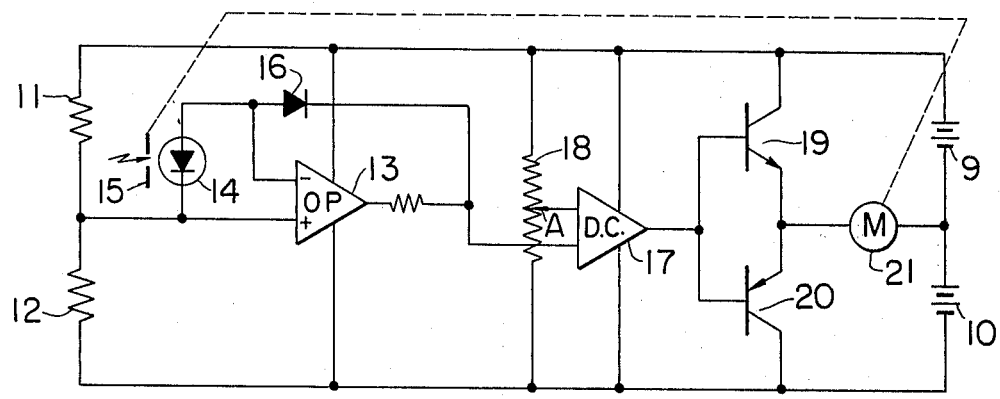
FIG. 2 shows a connection diagram of an embodiment of a control circuit for servo-motors according to the present invention.

In FIG. 2, numerals 9 and 10 respectively designate power source batteries of equal voltage connected in series. Numeral 11 and numeral 12 respectively designate bleeder resistors connected in series between terminals of power source batteries 9 and 10. Numeral 13 designates an operational amplifier (hereinafter called an OP amplifier) connected between terminals of said power source batteries 9 and 10, the non-inversion input terminal (hereinafter called a "plus" terminal) thereof being connected to the connecting point of said resistors 11 and 12. Numeral 14 designates a photoelectric element (such as a photodiode, silicon photocell, etc.) connected between both terminals on input side of said OP amplifier 13. Numeral 15 designates a diaphragm mechanism according to known art provided in front of said photoelectric element 14 for the purpose of varying the amount of incident light to said photoelectric element 14. Numeral 16 designates a diode connected between the inversion input terminal (hereinafter called a "minus" terminal) and output terminal of said OP amplifier for the purpose of carrying out logarithmic conversion of the photoelectric current generated at the element 14. Numeral 17 designates a DC amplifier connected between terminals of said power source batteries 9 and 10, one of input terminals thereof being connected to the output terminal of said OP amplifier and the other being connected to the movable terminal of the bleeder resistor 18 for setting the exposure information. Numerals 19 and 20 designate a pair of transistors with polarity different to each other, bases and emitters thereof being respectively connected to each other and bases thereof being connected to the output terminal of said DC amplifier. Numeral 21 designates a servo-motor connected to the connecting point of power source batteries 9 and 10 and to emitters of said transistors 19 and 20. The output shaft of said servo-motor 21 is interlocked with said diaphragm mechanism 15 and with a photographing lens diaphragm means of the camera which is not illustrated.

Figure 3:
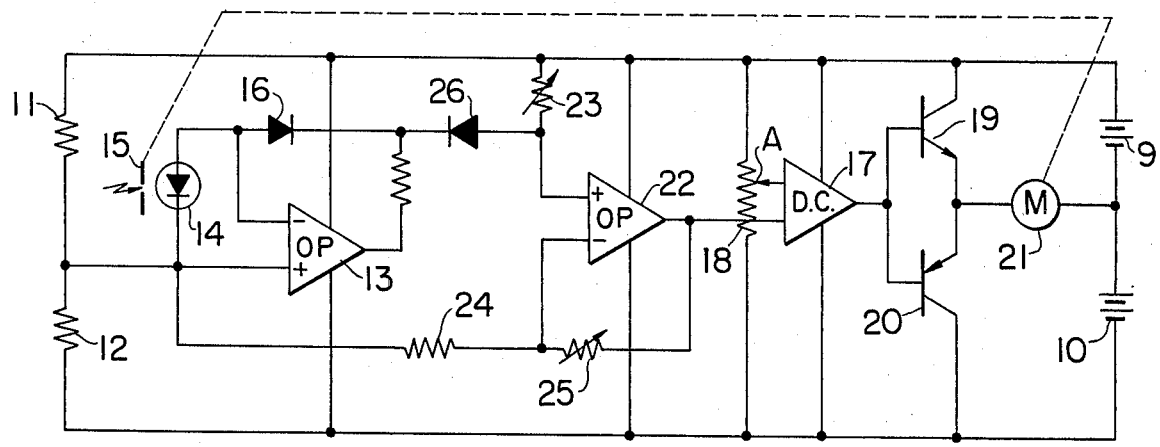
FIG. 3 shows a connection diagram of another embodiment of the control circuit according to the present invention.

FIG. 3 shows a control circuit in which a circuit for gain adjustment is added to the circuit shown in FIG. 2. In FIG. 3, same numerals and symbols are given to those members which are same as those in FIG. 2. Numeral 22 designates another OP amplifier connected between terminals of power source batteries 9 and 10. The "plus" terminal on input side of said OP amplifier 22 is connected to the power source battery 9 through a variable resistor 23, and the "minus" terminal is connected to the "plus" terminal on input side of the OR amplifier 13 through a resistor 24 and also to the output terminal of the OR amplifier 22 through a variable resistor 25. In this case, the variable resistor 23 can be replaced with a constant-current circuit. Numeral 26 designates a diode having the same characteristics as the diode 16 and connected respectively to the output terminal of the OP amplifier 13 and to the "plus" terminal on input side of the OP amplifier 22. The output terminal of the OP amplifier 22 is also connected to one of input terminals of the DC amplifier 17. FIG. 4 shows a control circuit in which a constant-current circuit is added to the circuit shown in FIG. 2. In the circuit shown in FIG. 4, numerals 27 and 28 respectively designate constant-current circuit blocks according to known art, and numeral 29 designates a variable resistor, both terminals thereof being connected to power source batteries 9 and 10 respectively through said constant-current circuits 27 and 28. The middle point of the variable resistor 29 is connected to the "plus" terminal on input side of the OP amplifier 13 and the movable terminal is connected to one of input terminals of the DC amplifier 17.

Figure 1:
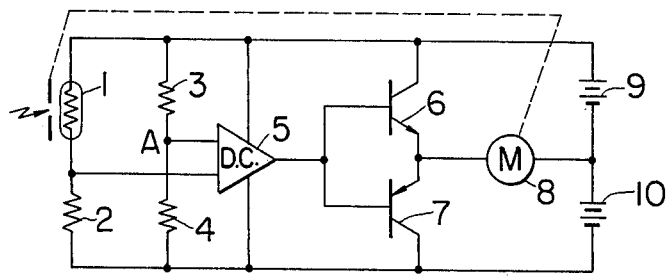
FIG. 1 shows a connection diagram of a control circuit for servo-motors according to known art.

FIGS. 5a and 5b respectively show curves of input and output characteristics of circuits shown in FIG. 1 and FIG. 4 in respect to fluctuation of power source voltage. In said figures, numerals 30 and 31 respectively designate input and output characteristic curves when the power source voltage is higher than a predetermined value and numerals 32 and 33 respectively designate input and output characteristic curves when the power source voltage becomes lower than said predetermined value.

FIG. 6 shows the characteristic curves illustrating the relation of the change of electric potentials at the exposure information setting points, i.e., the change of electric potentials at one of input terminals (point A) of the DC amplifier 17, to the change of exposure informations such as the sensitivity of the film to be used, film feeding speed, etc. in circuits shown in FIGS. 1 through 4. In said FIG. 6, a full line 34 shows the characteristic curve for the conventional circuit shown in FIG. 1 in which the photoconductive element such as CdS is used ($\gamma$ = const.). A one-dot chain line 35 and two-dot chain line 36 respectively show characteristic curves for circuits shown in FIGS. 2, 3 and 4 in which the photoelectric element such as silicon photocell is used.

In the circuit according to the present invention as described in the above, a photoelectric current in proportion to the amount of incident light is generated at the photoelectric element 14 in FIG. 2. That is, because of the characteristic of the OP amplifier 13, the load resistance of the photoelectric element 14 becomes equivalent to zero and, therefore, the amount of light vs. photoelectric current characteristic of the photoelectric element 14 shows favourable linearity.

On the other hand, the photoelectric current generated at the photoelectric element 14 flows through the diode 16. When, therefore, the diode 16 is used in the range until the forward current of the diode 16 begins to flow, the voltage vs. current characteristic of the diode 16 shows logarithmic characteristic. Consequently, on the output side of the OP amplifier 13, there occurs the output voltage in which the amount of input is logarithmically converted.

Now, the set voltage obtained by setting the exposure information such as the sensitivity of the film, film feed speed, etc. to the resistor 18 is compared with the above-mentioned output voltage obtained by logarithmic conversion, and that comparison voltage is amplified by the DC amplifier 17. According to the fact whether said comparison voltage is positive or negative, the transistor 19 or 20 becomes conductive and the servo-motor 21 rotates in either forward or reverse direction. By the servo-motor 21, the diaphragm mechanism 15 is operated and changes the amount of incident light to the photoelectric element 14. At that time, the photographic lens diaphragm means not shown is interlockingly operated with the diaphragm mechanism 15. When said comparison voltage becomes zero as a result of the above, said motor 21 stops and the photographing film is exposed by the proper exposure amount. When the amount of incident light to the photoelectric element 14 changes, said comparison voltage occurs, said motor 21 starts and an operation similar to the above is repeated.

As will now be discussed, the above-mentioned logarithmically converted voltage changes in direct proportion to the change of the light value $L_v$ of the amount of incident light.

When reference symbol B represents the brightness of the object and reference symbol I represents the photoelectric current generated at the photoelectric element 14, the relation of B and I becomes as follows:

$$I = \alpha B$$

(where, $\alpha$ represents a constant)
To the diode 16, the photoelectric current I flows as it is. Therefore, a logarithmically converted voltage $V_D$ having the following relation occurs between both terminals of the diode 16.

$$\log I = kV_D$$

(where, $k$ represents a constant)
Besides, for the light value $L_V$ of the amount of incident light, the following relationship exists:

$$2^{L_V} = B \cdot S/K$$

(where, $S$ represents the exposure index of film and $K$ represents a constant, respectively). This relationship is well known and is set forth in an article entitled "Construction and Function of Photographic Camera" by Masamichi Kadodate appearing in Optical Technique, 1971, Vol. 8, published by the Japan Optical Engineering Research Association. When the above formula is shown by logarithms:

$$L_1 \cdot \log 2 = \log B \cdot S/K$$

$$L_v = \frac{\log B + \log \frac{S}{K}}{\log 2} = \frac{\log I - \log \alpha + \log \frac{S}{K}}{\log 2} = \frac{k \cdot V_D}{\log 2} + \frac{\log \frac{S}{\alpha K}}{\log 2}$$

Therefore, the amount of change ($\Delta L_V$) from $L_{V1}$ of the light-value $L_V$ may be represented as follows by using the difference of terminal voltage $\Delta V (= V_{D1} - V_{D2})$ of the diode 16 which corresponds to the change of light-value as above.

$$\Delta L_V = L_{V1} - L_{V2} = \frac{K(V_{D1} - V_{D2})}{\log 2} = K' \Delta V_D$$

That is, the logarithmically converted voltage changes in direct proportion to the change of the light-value $L_V$ of the amount of incident light.

On the other hand, in the conventional circuit shown in FIG. 1, the change of the light value of the amount of incident light and voltage do not change in direct proportion to each other. That is, when resistant values of the photoconductive element 1 and resistors 2, 3 and 4 are respectively represented by reference symbols $R_1$, $R_2$, $R_3$ and $R_4$ and gamma of the photoconductive element 1 is $= 1 (= \text{const.})$, the relation of respective resistance values becomes as follows at the time of proper exposure.

$$R_1 = R_2 = R_3 = R_4$$

When the light-value of the amount of incident light is changed by $+1L_V$ in the above, for instance, $R_1$ becomes as follows:

$$R_1 = R_2/2$$

Consequently, when the total voltage of the batteries 9 and 10 is Vcc, the change of voltage between output terminal A and the junction of photocell 1 and resistor 2 becomes as follows:

$$\Delta V = \tfrac{2}{3} V_{cc} - \tfrac{1}{2} V_{cc} = 1/6 V_{cc}$$

When the light-value of the amount of incident light is changed by $+2L_V$, as $R_1$ is equivalent to $R_2/4$ the change of voltage becomes as follows:

$$\Delta V = 4/5 V_{cc} - 1/2 V_{cc} = 3/10 V_{cc}$$

Thus, the voltage does not change in direct proportion to the light-value of the amount of incident light.

FIG. 3 shows a circuit in which a gain adjusting circuit is added to the logarithmic conversion circuit shown in FIG. 2. An explanation is given below only for the gain adjusting function which is different from the function of the circuit shown in FIG. 2. First of all, the diode 26 used in this circuit has a characteristic equal to that of the diode 16. Therefore, when the variable resistor 23 is adjusted so that the current, which flows to the diode 16 when the reference input is given, flows to the diode 26, the voltage same as that imposed to the "minus" terminal on input side of the OP amplifier 13 can be imposed to the "plus" terminal on input side of the OP amplifier 22. Therefore, it is possible to set the zero level of the logarithmically converted voltage in respect to the reference input. On the other hand, when resistance values of resistors 24 and 25 are respectively represented by reference symbols $R_{24}$ and $R_{25}$ and output of the OP amplifier 22 is represented by $V_0$, $V_0$ . $R_{24}/(R_{24} + R_{25})$ becomes equal to the input voltage $V_S$. Therefore, the gain of the OP amplifier 22 becomes as follows:

$$\frac{V_0}{V_S} = \frac{R_{24} + R_{25}}{R_{24}} = 1 + \frac{R_{25}}{R_{24}}$$

Thus, it may be understood that, as the light-value $L_V$ is equivalent to exposure-value $E_V$ under the proper exposure condition, the gain of the OP amplifier can be changed by adjusting the resistor 25.

The above means that the characteristic of the amount of change of exposure value $E_V$ vs. change of voltage at point A can be changed as shown by curves 35 and 36 in FIG. 6 and that the potential can be set easily by adjusting the gain according to the amount of change of the exposure information value.

FIG. 4 shows a control circuit in which a constant current circuit is added to the circuit for introducing the exposure information shown in FIG. 2. In practice, constant current circuit blocks 27 and 28 may be arranged by using circuits of known art in which, for example, Zener diodes and transistors are combined. By arranging the circuit as above, reference points of inputs to the OP amplifier 13 and DC amplifier 17 becomes always constant even if the power-source voltage fluctuates. In this case, it is assumed that the input vs. output characteristic of the DC amplifier 17 iteslf does not change even when the power-source voltage fluctuates. That is, in this case, the gain characteristic does not change as shown by curves 31 and 33 in FIG. 5b. On the other hand, in case of the conventional circuit shown in FIG. 1, the gain characteristic changes as shown in FIG. 5a and, therefore, the correct input vs. output characteristic cannot be obtained when the power-source voltage changes.

In the control circuit according to the present invention, it is also possible to use other kinds of logarithmic conversion elements instead of diodes 16 and 26. Besides, in the above, embodiments of two power source system are described. However, it is also possible to adopt the one power source system instead of the above.

I claim:

1. A control circuit for servo-motors comprising an operational amplifier, a photoelectric element having a diaphragm means in front thereof and connected between two input terminals of said operational amplifier, a logarithmic conversion element connected between one input terminal and an output terminal of said operational amplifier, a direct current amplifier having an input terminal connected to the output terminal of said operational amplifier, a bleeder resistor for setting information having a movable terminal connected to another input terminal of said direct current amplifier, and a servo-motor mechanically interlocked with said diaphragm means and connected to an output of said direct current amplifier, said control circuit being capable of controlling rotation and stopping of said servo-motor by making comparison between voltage at the movable terminal of said bleeder resistor and voltage at the output terminal of said operational amplifier.

2. A control circuit for servo-motors according to claim 1 further comprising two constant-current circuit blocks respectively connected to two fixed terminals of said bleeder resistor.

3. A control circuit for servo-motors comprising a first operational amplifier having inversion and non-inversion input terminals, a photoelectric element having a diaphragm means in front thereof and connected between said input terminals of said first operational amplifier, a first logarithmic conversion element connected between one input terminal and an output terminal of said first operational amplifier, a second logarithmic conversion element having a first terminal connected to the output terminal of said first operational amplifier and having characteristics the same as said first logarithmic conversion element, a second operational amplifier having a non-inversion input terminal connected to a second terminal of said second logarithmic conversion element, a first resistor with one end connected to said second terminal of said second logarithmic conversion element, a second resistor connected between the non-inversion input terminal of said first operational amplifier and an inversion input terminal of said second operational amplifier, a variable resistor connected between the inversion input terminal and an output terminal of said second operational amplifier, a direct current amplifier having an input terminal connected to the output terminal of said second operational amplifier, a bleeder resistor for setting information having a movable terminal connected to another input terminal of said direct current amplifier, and a servo-motor mechanically interlocked with said diaphragm means and connected to an output of said direct current amplifier, said control circuit being capable of controlling rotation and stopping of said servo-motor by making comparison between voltage at the movable terminal of said bleeder resistor and voltage at the output terminal of said second operational amplifier and being also capable of adjusting the gain of said second operational amplifier by adjusting said variable resistor.

\* \* \* \* \*